(12) United States Patent
Yau (10) Patent No.: US 10,915,447 B1
(45) Date of Patent: Feb. 9, 2021

(54) SYSTEMS, DEVICES, AND METHODS FOR REDUCED CRITICAL PATH LATENCY AND INCREASED WORK PARALLELIZATION IN MEMORY WRITES

(71) Applicant: Johnny Yau, Jersey City, NJ (US)

(72) Inventor: Johnny Yau, Jersey City, NJ (US)

(73) Assignee: Johnny Yau, Jersey City, NJ (US)

( * ) Notice: Subject to any disclaimer, the term of this patent is extended or adjusted under 35 U.S.C. 154(b) by 0 days.

(21) Appl. No.: 16/262,055

(22) Filed: Jan. 30, 2019

Related U.S. Application Data

(60) Provisional application No. 62/623,605, filed on Jan. 30, 2018.

(51) Int. Cl.
*G06F 12/0862* (2016.01)
*G06F 12/084* (2016.01)

(52) U.S. Cl.
CPC ........ *G06F 12/0862* (2013.01); *G06F 12/084* (2013.01); *G06F 2212/1024* (2013.01); *G06F 2212/1041* (2013.01); *G06F 2212/602* (2013.01)

(58) Field of Classification Search
CPC .............. G06F 12/0862; G06F 12/084; G06F 2212/1024; G06F 2212/1041; G06F 2212/602
See application file for complete search history.

(56) References Cited

U.S. PATENT DOCUMENTS

| 4,835,678 A | * | 5/1989 | Kofuji | G06F 12/0859 711/118 |
| 6,490,654 B2 | * | 12/2002 | Wickeraad | G06F 12/121 711/133 |
| 2004/0158679 A1 | * | 8/2004 | Hooker | G06F 9/3004 711/137 |
| 2016/0246715 A1 | * | 8/2016 | Ignatowski | G06F 12/0802 |

* cited by examiner

*Primary Examiner* — Michelle T Bechtold
(74) *Attorney, Agent, or Firm* — Troutman Pepper Hamilton Sanders LLP; Christopher C. Close, Jr.

(57) ABSTRACT

A system including: a reader; a writer; and a shared memory shared by the reader and the writer, wherein the writer is configured to: specify, in the shared memory, first and second cache lines as unsafe to read; prefetch sole ownership of the first and second cache lines; specify, after the prefetching, that the first and second prefetched cache lines are safe to read; write data to the first prefetched cache line in the shared memory; and in response to completing writing data to the first prefetched cache, relinquish control of the first prefetched cache line to a reader.

20 Claims, 6 Drawing Sheets

SYSTEMS, DEVICES, AND METHODS FOR REDUCED CRITICAL PATH LATENCY AND INCREASED WORK PARALLELIZATION IN MEMORY WRITES

CROSS-REFERENCE TO RELATED APPLICATIONS

This application claims the benefit of U.S. Provisional Application No. 62/623,605, filed Jan. 30, 2018.

BACKGROUND

Modern computer systems include distributed cache memories to speed access to memory shared among multiple components in the computer system. The shared memory systems that include cache memories typically utilize a cache coherency protocol such as MOESI, MESI, MESIF, or other related cache coherency protocol. The protocols are designed to arbitrate shared memory utilization in a coherent and consistent manner among multiple components in the presence of distributed cache memories.

Shared memory can be logically organized into units called cache lines. Copies of a particular cache line may be present in multiple components' local cache memories. In many implementations of cache coherency, to maintain coherency and consistency, the protocols require that a component intending to write to a cache line first notify all other components (or a directory) in the system of the component's intent and then confirm that the component has the only writable copy of the cache line in question. Put differently, the component must gain "Modified" (also commonly referred to as "Dirty") or "Exclusive" (also commonly referred to as "Valid") state on its own local copy of the cache line. In the research literature, this technique is commonly called "invalidation." Note that invalidation may be in the form of explicit invalidation or implied in actions such as, but not limited to, read for exclusive control. Modified ("M") and Exclusive ("E") states share a property; the writer with a local copy of a cache line in those states is the only component in the system that has permission to write to the cache line if the system's shared memory is to stay coherent and consistent.

When a writer needs to write to multiple cache lines (i.e., perform a "bulk transfer"), typically it has to complete writing to all of the cache lines before it can notify the reader that it is safe to read from any of the cache lines. Notification may be accomplished by means of an indication mechanism (e.g., an indicator flag) which reports completion. Since it is assumed that the reader may read from any cache line included in the bulk transfer, the order of the operations perceived by the reader between the bulk transfer and indication must be strictly enforced. Otherwise the reader may incorrectly read data from a cache line which has not been written to and thus may contain stale data. As a result, while the write transactions on cache lines involved in a data transfer may have already been completed, the reader cannot access data until the bulk write has completely finished; this is a missed opportunity for parallel processing between components in the system. Moreover, the "Observed Latency," which for the purpose of this application references the time which elapses between when the writer initiates a write to a cache line and when the data is permitted to be read from that cache line, is increased beyond the minimums achievable since the writer must complete all of its writes before the reader can even begin to read any data.

Aspects of the disclosed technology address this inefficiency by allowing a reader to begin safely reading data from a group of cache lines before the writer has finished its bulk transfer. Aspects of the disclosed technology are related to systems and methods for providing reduced critical path latency and increased work parallelization in cache coherent direct memory access writes.

SUMMARY

According to some embodiments, there is provided a system including: a reader; a writer; and a shared memory shared by the reader and the writer, wherein the writer is configured to: specify, in the shared memory, a plurality of cache lines as unsafe to read, the plurality of cache lines including first and second cache lines; prefetch sole ownership of the first and second cache lines; specify, after the prefetching, that the first and second prefetched cache lines are safe to read; write data to the first prefetched cache line in the shared memory; and in response to completing writing data to the first prefetched cache, relinquish control of the first prefetched cache line to the reader.

The writer may be further configured to: write data to the second prefetched cache line; and in response to completing writing data to the second prefetched cache, relinquish control of the first prefetched cache line to the reader.

The writer may be configured to relinquish control of the first prefetched cache line before completing writing data to the second prefetched cache line.

The writer may be further configured to: receive, from the reader, a request to read the first and second prefetched cache lines; delay a response to the reader regarding the first prefetched cache line until writing data to the first prefetched cache line is complete; and delay a response to the reader regarding the second prefetched cache line until writing data to the second prefetched cache line is complete.

The reader may be configured to begin reading the first prefetched cache line prior to receiving the response regarding the second prefetched cache line.

The writer may be further configured to: receive, from the reader, a request to read the first prefetched cache line; and delay a response to the reader until writing data to the first prefetched cache line is complete.

The writer may be configured to specify the first and second cache lines as unsafe to read by setting an indicator flag, and specify the first and second cache lines as safe to read by resetting the indicator flag.

The writer may be configured to prefetch sole ownership of the first and second cache lines by setting the first and second cache lines to a Modified ("M") state or an Exclusive ("E") state.

According to some embodiments, there is provided a write method including: specifying a first cache line and a second cache line as unsafe to read; prefetching sole ownership of the first and second cache lines; specifying, after the prefetching, that the first and second prefetched cache lines are safe to read; writing data to the first prefetched cache line; and in response to writing data to the first prefetched cache being complete, relinquishing control of the first prefetched cache line to a reader.

The method may further include: writing data to the second prefetched cache line; and in response to writing data to the second prefetched cache being complete, relinquishing control of the second prefetched cache line to the reader.

The control of the first prefetched cache line may be relinquished before writing data to the second prefetched cache line is complete.

The method may further include: receiving, from the reader, a request to read the first and second prefetched cache lines; delaying a response to the reader regarding the first prefetched cache line until writing data to the first prefetched cache line is complete; and delaying a response to the reader regarding the second prefetched cache line until writing data to the second prefetched cache line is complete.

The reader may read the first prefetched cache line prior to receiving the response regarding the second prefetched cache line.

The method may further include: receiving, from the reader, a request to read the first prefetched cache line; and delaying a response to the reader until writing data to the first prefetched cache line is complete.

According to some embodiments, there is provided a writer including: a connector to a shared memory; and a processor configured to: specify, in the shared memory, first and second cache lines as unsafe to read; prefetch sole ownership of the first and second cache lines; specify, after the prefetching, that the first and second prefetched cache lines are safe to read; write data to the first prefetched cache line in the shared memory; and in response to completing writing data to the first prefetched cache, relinquish control of the first prefetched cache line to a reader connected to the shared memory.

The processor may be further configured to: write data to the second prefetched cache line; and in response to completing writing data to the second prefetched cache, relinquish control of the first prefetched cache line to a reader.

The processor may be further configured to relinquish control of the first prefetched cache line before completing writing data to the second prefetched cache line.

The processor may be further configured to: receive, from the reader, a request to read the first and second prefetched cache lines; delay a response to the reader regarding the first prefetched cache line until writing data to the first prefetched cache line is complete; and delay a response to the reader regarding the second prefetched cache line until writing data to the second prefetched cache line is complete.

The reader may be configured to begin reading the first prefetched cache line prior to receiving the response regarding the second prefetched cache line.

The writer may include a field-programmable gate array (FPGA).

BRIEF DESCRIPTION OF THE FIGURES

Implementations, features, and aspects of the disclosed technology are described in detail herein and are considered a part of the claimed disclosed technology. Other implementations, features, and aspects can be understood with reference to the following detailed description, accompanying drawings, and claims. Reference will now be made to the accompanying figures and flow diagrams, which are not necessarily drawn to scale.

DETAILED DESCRIPTION

According to example embodiments of the invention, during a multiple cache line bulk transfer, the writer can selectively prevent the reader from reading any given cache line involved in the bulk transfer. Accordingly, the writer does not need to wait for the bulk transfer to complete before allowing the reader to begin reading some data (i.e., cache lines in the bulk transfer that have already been written). In certain cache coherency protocols, readers are forced to request updates from the writer, possibly through other components (e.g., a directory). In these cases, the writer simply allows the reader to read cache lines that have completed writes and withholds read responses for cache lines for which writes have not completed until those writes have completed. If a reader attempts to read a withheld cache line, that reader will not be able to proceed with the operation. It will be appreciated that from the perspective of the reader, a withheld read response appears to be no different than a read which is taking an unusually long time to complete. Therefore, typically no modification to the reader logic are necessary to incorporate the disclosed design. Moreover, if the reader is capable of out-of-order execution or executing instructions from another thread, the reader still can process unaffected instructions.

To gain the "critical property", which allows the writer to selectively prevent the reader from reading any cache lines involved in a bulk transfer, the writer can speculatively and pre-emptively initiate the invalidation process in the shared memory system and gain M or E state. As will be understood by one of ordinary skill in light of the present disclosure, components that hold local copies of cache lines in M or E states have an interesting property are the only components in the system with permission to write to those cache lines. Typically, when the writer's local copy of a cache line is in M or E state, the writer has the only valid copy of the cache line in the system. In such situations, readers must request the updated cache line from the writer before proceeding with a read. It will be appreciated that as long as the writer holds a superset of all cache lines involved in the transfer of M or E states, the critical property holds. Hence, even if the exact size of a bulk transfer is not known ahead of time, but is either known to be within some predetermined size (e.g., the MTU of Ethernet packets or the result of a well-known calculation) or easily guessed with reasonable accuracy (e.g., based on historical batch bulk transfers or based on a system design), it is possible to construct a transfer process which enables some parallelization of reading and writing multiple cache lines, which thereby further reduces Observed Latency.

In cache coherency protocols that support "updates," modified data can be pushed out to interested readers after a writer writes the new data to its local copy of cache. In contrast, in related art systems that do not support updates, a reader gains access to newly written data only after a longer three-step process wherein a writer first invalidates the related cache line, writes the new data to its local copy of the cache line, and waits for a request message sent by a reader. Certain implementations of protocols that support updates may not allow the writer to unilaterally prevent the reader from reading a cache line. However, one of ordinary skill will recognize that the disclosed technology can be adapted to disseminate new data to readers utilizing one or more alternative mechanisms wherein the writer maintains the ability to prevent the reader from reading cache lines without departing from the scope of the present disclosure.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. It is to be understood, however, that implementations of the disclosed technology may be practiced without these specific details. In other instances, well-known methods, structures and techniques have been omitted in order to avoid obscuring an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Example implementations of the disclosed technology will now be described with reference to the accompanying figures.

Figure 1:
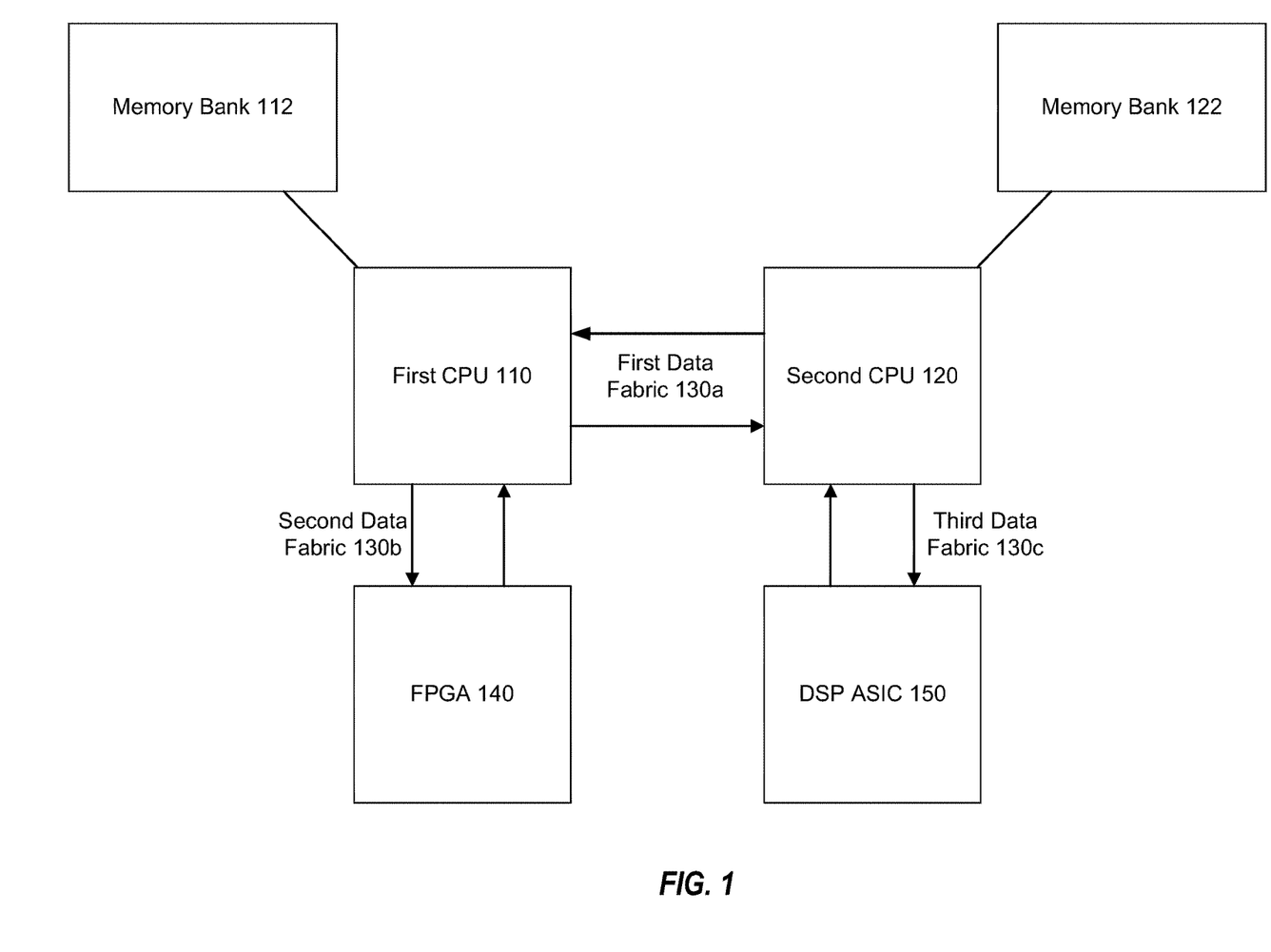
FIG. 1 offers an overview of a computer architecture in which first and second CPUs can exchange data using a point-to-point processor interconnect.

FIG. 1 illustrates an overview of a conventional computer architecture 100 in which first and second CPUs 110 and 120 can exchange data using a point-to-point processor interconnect or "first data fabric" 130a. Each of the first and second CPUs 110 and 120 may have a respective memory bank 112 and 122. The first CPU 110 communicates with a field-programmable gate array (FPGA) 140 over a "second data fabric" 130b. The second CPU 120 communicates with a digital signal processor (DSP) or an application-specific integrated circuit (ASIC) 150 over a "second data fabric" 130c. In addition to the components shown in FIG. 1, the conventional computer architecture can include some or all of the components of computing device 500 shown in FIG. 5.

In computing systems, such as a computing system having the architecture shown in FIG. 1, devices 110 and 120 can exchange data using shared memory. Similarly, in some computer systems, FPGA 140 and device 110 may exchange data using shared memory, and/or DSP/ASIC 150 and device 120 can exchange data using shared memory. For example, in a common data exchange scheme, data is read and written to an agreed memory location. The writer indicates that the data is ready to be read by setting a flag in the shared memory. The reader polls the flag to determine if it is safe to read the data. Accordingly, a typical data transfer may first include making data available to write (e.g., by the writer setting an indicator flag to indicate that the cache is not safe). Next, the writer writes data into all cache lines. Once the writer completes writing to all cache lines, it releases the data (e.g., by changing the indicator flag) and the reader may read the cache lines. Thus, in the related art, a reader must wait for the entire write to complete before it can access any of the cache lines involved in a bulk transfer. Certain implementations of the present disclosure seek to reduce the Observed Latency by prefetching the cache lines and delaying read responses on an individual cache line basis until the write to the individual cache line is complete.

Figure 2:
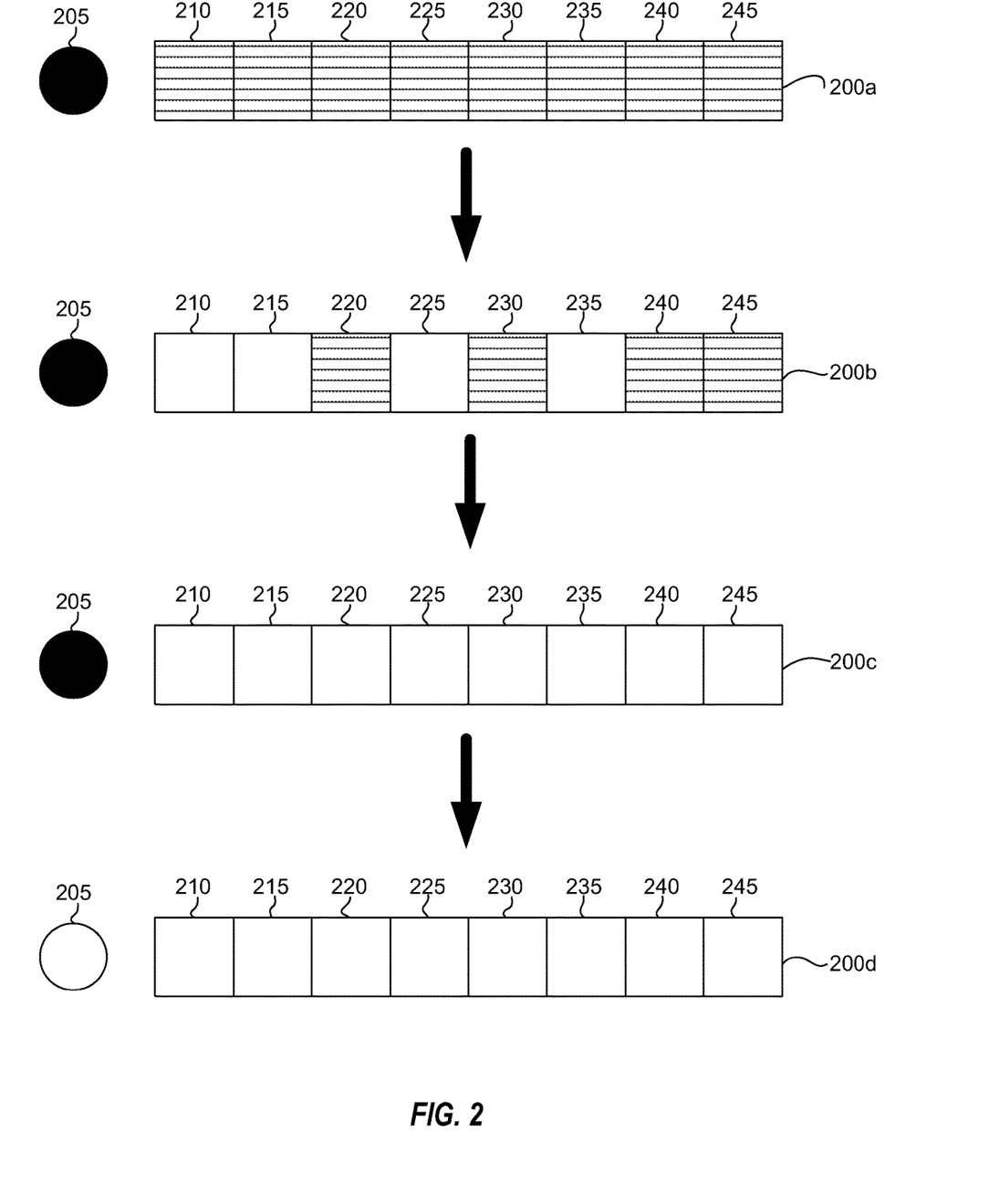
FIG. 2 offers an illustration of a schema by which a writer and reader coordinate data transfer in a cache coherent memory system in the related art.

FIG. 2 illustrates data transfer within a shared-memory space in a computer system using a related art data transfer scheme that makes use of an indicator mechanism (e.g., an indicator flag). Although the indicator mechanism may be generally discussed as an indicator flag, one of ordinary skill will recognize that the indicator can take many forms including, but are not limited to, an indicator flag or interrupt. The circle 205 represents an indicator flag. As will be understood by one of ordinary skill, a writer sets the indicator flag 205 to signal to the reader whether it is safe to read the data in the shared memory space. In FIG. 2, black circles represent the flag 205's state when it is not safe for the reader to read data, and white circles indicate that the data is safe to read data. The squares 210-245 each represent a single cache line. Horizontally filled squares indicate potentially stale cache lines and white squares represent cache lines with new data written by the writer and destined for the reader.

As will be understood, in this FIG. 2 example of a related art data transfer scheme, the indicator flag 205 may be set to "not safe" in 200a, and cache lines 210-245 are considered stale. The writer (e.g., FPGA 140) begins writing data to the cache lines 210-245. At 200b, the writer is in the process of writing data to the cache lines 210-245, with cache lines 210, 215, 225, and 235 containing new data. The indicator flag 205 is still set to "not safe." At 200c, the writer completes the bulk transfer as all cache lines 210-245 contain new data. However, the indicator flag 205 is still set to "not safe." Finally, at 200d, the writer sets the indicator flag 205 to the "safe to read" state, and the reader (e.g., first CPU 110) may begin reading the data from the bulk transfer. Accordingly, in the related art, the reader must wait for all of the data to be written by the writer and all the cache lines in the bulk transfer to be released before it can even begin the process of reading any of the cache lines in shared memory. As will be understood by one of ordinary skill in light of the present disclosure, the transactions associated with writing data to cache lines (e.g., 200b), completing the bulk transfer (200c), and then finally changing the state of the indicator flag 205 to specify safe reading (200d), create coordination overhead associated with the writer communicating new data to a reader and are responsible for the Observed Latency.

As noted previously, modern computer systems implement cache memory using distributed cache memory protocols. In such distributed cache memory protocols, the memory is subdivided into units of cache lines and the cache memory protocol arbitrates reads and writes so that components in the computing system (e.g., the computing system shown in FIG. 1) can see the memory in a consistent manner.

In such configurations and according to cache coherency protocols, components must ensure that they have the only copy of a cache line in the system before effecting writes. In such regimes, once a writer ensures that it has the only writeable copy of a cache line in the system, no read to that cache line may proceed until the writer relinquishes control of the cache line.

Aspects of the present disclosure include a modification to existing cache coherency protocols in which the writer unilaterally holds a response to a read request regardless of whether there is data to be written or not. In some implementations, the disclosed technology leverages the fact that reads to a particular cache line cannot proceed, even after the writer ensures that it has the only writable copy of a cache line in the system, until the writer relinquishes control of the cache line. In particular, in some embodiments, by gaining direct control of the cache, the disclosed technology provides a data transfer scheme where readers can process partial results at the granularity level of single cache lines while writes are in progress, which can reduce latency and increase the processing speed of a computer system.

As will be appreciated by one of ordinary skill, most modern high-performance computing systems execute instructions out of order and potentially from different threads to make fuller use of the CPU execution units. Such computing systems are designed to cope with long memory read delays. One aspect of the disclosed technology (i.e., having the writer unilaterally hold a response) results in reads that look no different to system components than long memory read delays. Furthermore, aspects of the disclosed technology reduce the number of reads sent by the CPU while polling, which frees up the CPU to execute instructions that do not depend on the read. Generally, while the CPU is waiting for the read to complete, the CPU first will attempt to execute instructions in the same thread out of order, and if the CPU is unable to execute any out-of-order instructions, the CPU will execute instructions from another thread.

E or M states cannot, however, be held indefinitely when there is an outstanding read request from the reader. The writer must respond to the reader before the reader reaches a predefined timeout that indicates that an error has occurred. If the writer does not have anything to write, then the writer typically responds with an indication to the reader that the writer does not have a valid copy of the cache line (i.e., the writer responds that nothing has changed with the writer's status).

To maximize the odds of a write not having to incur coordination overhead, according to some implementations of the disclosed technology, the writer can be configured such that it immediately again prefetches the cache line as soon as possible after relinquishing it. Thus, when the writer is holding the cache line in E or M states, a write can immediately proceed. Further, if a prefetch is in progress when a write is ready, the writer does not incur the full overhead of the coordination.

Figure 3A:
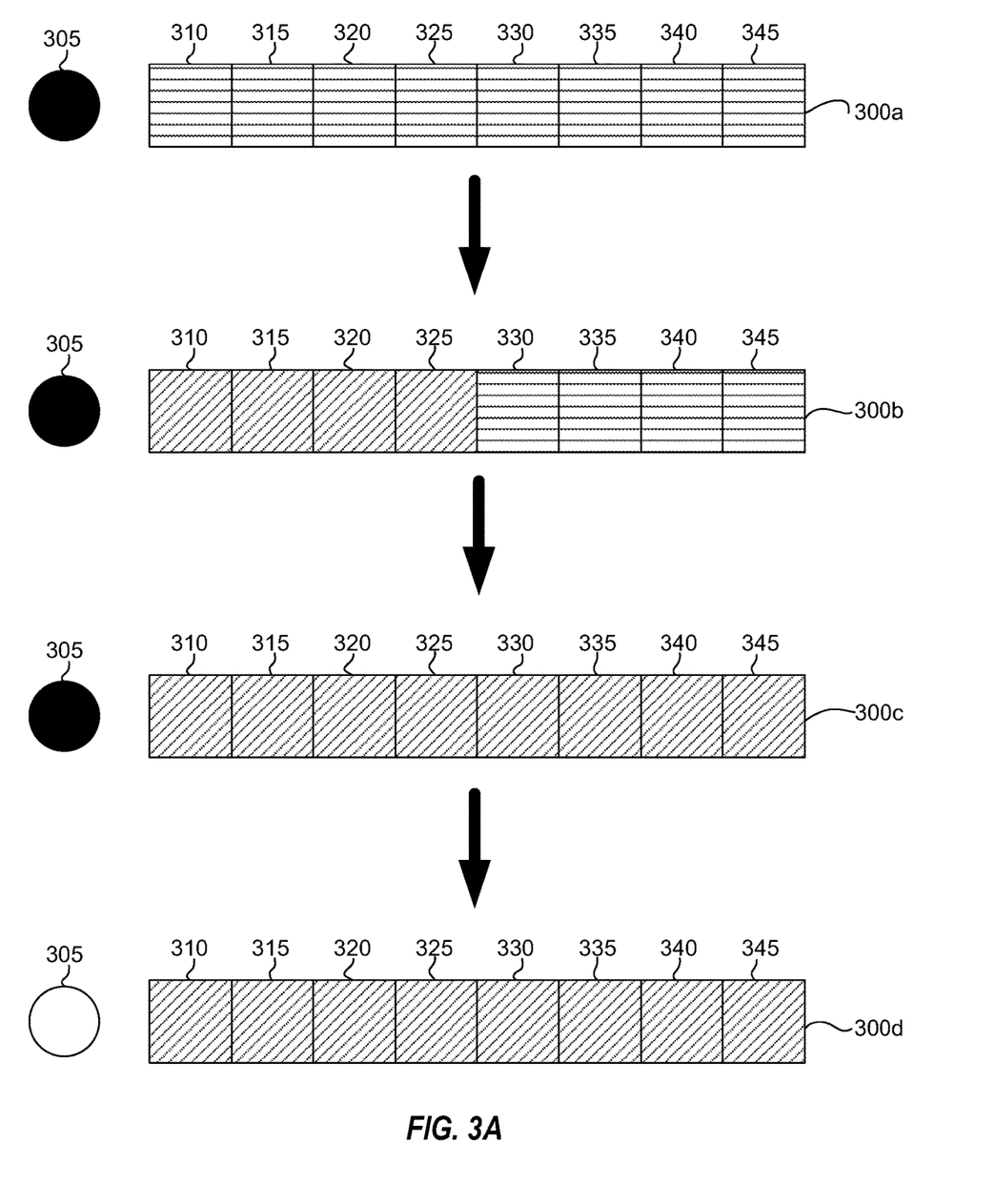
FIGS. 3A and 3B depict a method by which aspects of the disclosed technology enable a reader to read individual cache lines that are part of a group of cache lines that a writer is still actively populating with data.
Figure 3B:
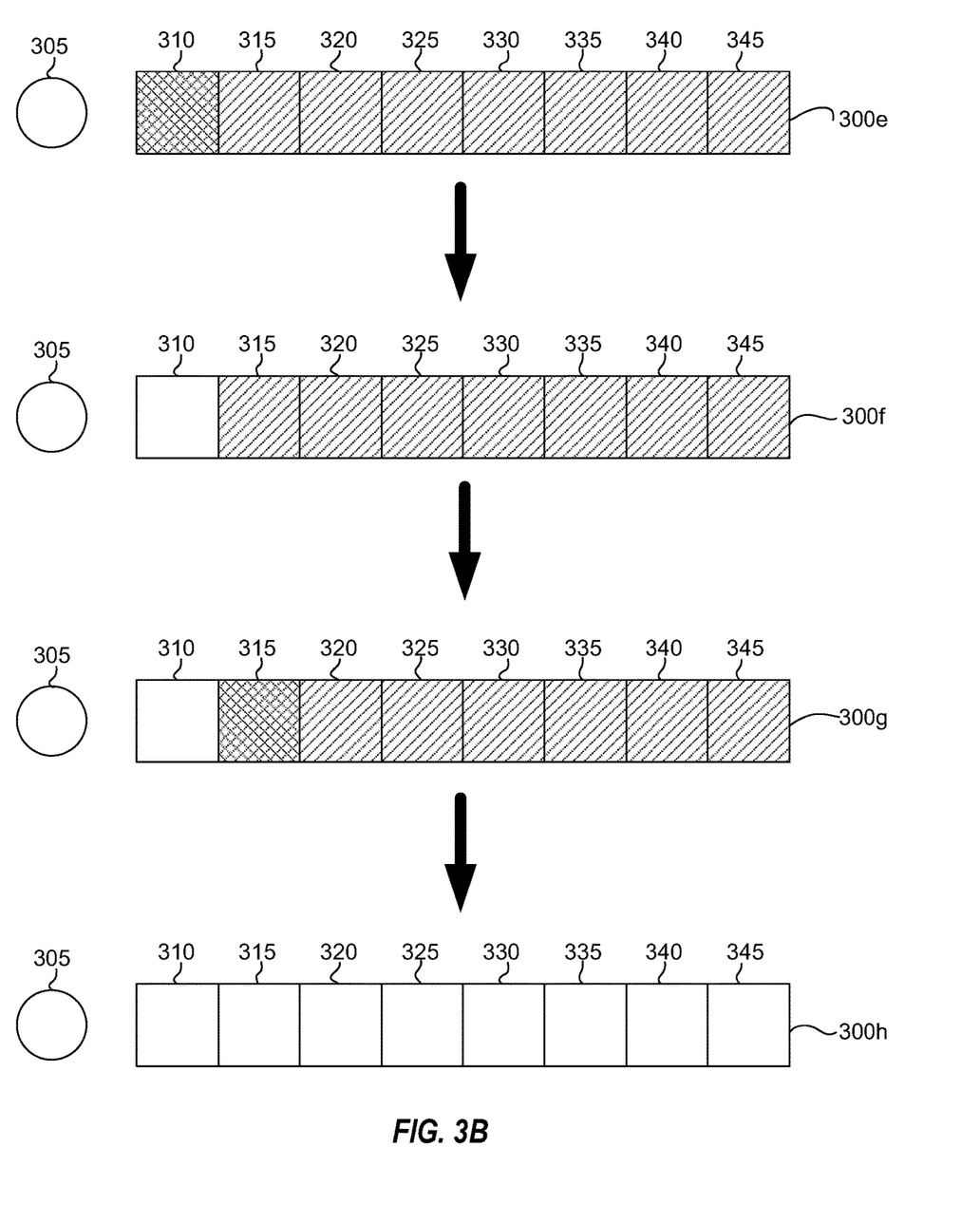

FIGS. 3A and 3B illustrate a data transfer within a shared-memory space in a computer system using hold and prefetch principles according to an embodiment of the present disclosure. The symbology in FIGS. 3A and 3B carries over from FIG. 2 with two additions: the diagonal-lined-filled boxes represent writer ownership of the associated cache line, and the crosshatch-filled boxes represent cache lines to which the writer is currently writing new data.

In contrast to the approach depicted in FIG. 2, the disclosed technology described in FIGS. 3A and 3B allows the reader to read data in one-cache-line units while the writer is still writing new data to other cache lines thereby reducing Observed Latency. In an example implementation, this is accomplished as follows:

First, at 300a, the indicator flag 305 is set to specify that the cache lines 310-345 (or buffer) involved in the bulk transfer are not safe to read. Cache lines 310-345 are potentially stale as indicated by the horizontal fill-in. The writer (e.g., FPGA 140) has not written any new data. Next, at 300b, the writer begins prefetching the cache lines 310-345 involved in the bulk transfer for sole ownership of the cache lines. Cache lines 310-325 are prefetched. The writer prefetches all of the relevant cache lines 310-345, as shown in 300c, and the writer sets the indicator flag 305 to indicate that the reader (e.g., first CPU 110) may now read the cache lines 310-345 in the buffer as shown in 300d. This change in indicator flag state indicates the completion of the pre-fetch process. Note that even though the state of the indicator flag has been altered to allow reading, the writer has yet to write any data and the data in the cache lines is still stale. Critically, regardless of the state of the indicator flag, the stale data is not transmitted to the reader since the writer still holds all the individual cache lines in E or M state.

At 300e, the writer begins writing data to the buffer, writing data into cache line 310. At 300f, the writer completes its write to that cache line 310 and relinquishes control of the cache line to the reader since cache line 310 now contains the new data. Although the reader is now able to read the cache line 310 with new data (i.e., the cache line for which the writer has now relinquished control), the writer has not finished writing new data to all cache lines 315-345 in the buffer. At 300g, the writer continues writing data to the buffers, specifically writing data to cache line 315. Once the writer completes writing data to cache line 315, the writer will relinquish control of the cache line to the reader, and continue writing data to the other cache lines 320-345. This process continues until the writer has finished writing all new data to the cache lines 310-345, and the reader has read that very same data as shown in 300h. The key insight is that this highly orchestrated process involves the simultaneous and reading and writing of various cache lines 310-345 in the buffer thereby reducing Observed Latency due to parallelization of tasks.

Although FIGS. 3A and 3B illustrate cache lines 310-345 being written to in order from left to right, one of ordinary skill will recognize that this is merely an example. In some cases, cache lines may be written to and released in various orders. Moreover, in some cases, the writer may not need to write to one or more of the prefetched cache lines. For example, if the writer prefetches cache lines 310-345, but does not need to write to cache line 340, the writer may release cache line 340 to the reader upon request without writing data thereto. The simultaneous and coordinated read/write process illustrated in FIGS. 3A and 3B serves to reduce the Observed Latency in data transfer relative to the conventional approach.

Figure 4:
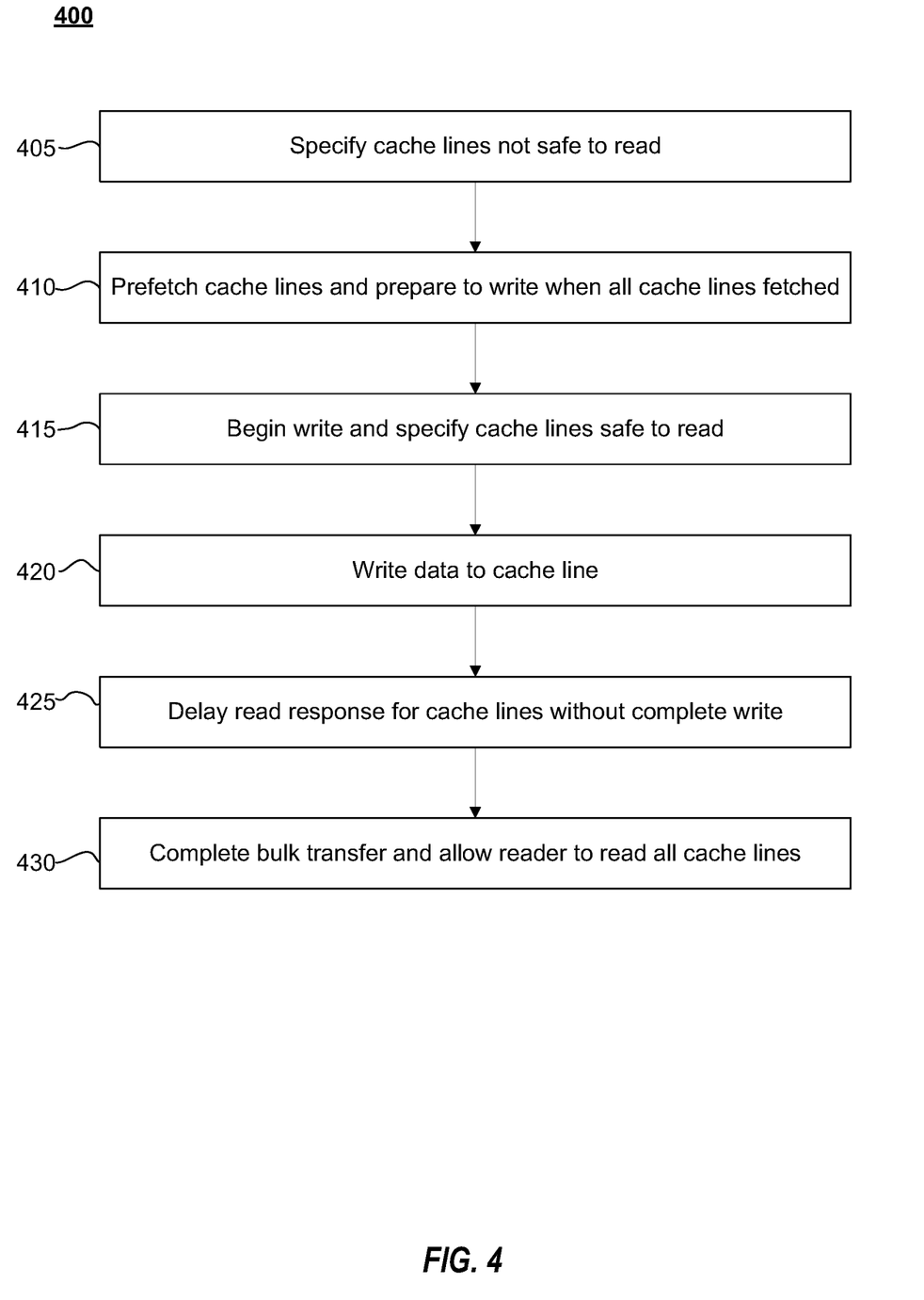
FIG. 4 is a flowchart of a bulk transfer method according to an example embodiment.

FIG. 4 is a flowchart 400 of a bulk transfer method according to an example embodiment. The method may be performed, for example, by a writer utilizing a cache coherent memory system. The writer specifies 405 certain cache lines that are not safe to read (e.g., by setting an indicator flag). The writer 405 may specify cache lines that a future write is known to require, and/or may predict cache lines needed for a future write. At this point, the cache lines are potentially stale. The writer than prefetches 410 the cache lines for sole ownership and prepares to write once all cache lines are fetched. This prefetching 410 alerts the reader that the cache lines held by the reader are potentially stale. Thus, should the reader desire to read the cache lines, it must first request updates from the writer.

The writer begins 415 writing to the cache lines and indicates the cache lines are safe to read (e.g., by resetting the indicator flag). The writer writes 420 data to the cache lines. While writing data, the writer may receive a request from a reader. The writer delays 425 read responses for cache lines without a complete write. However, as each cache line is written to 420, control of the cache line may be relinquished to the reader and the read may read that cache line. The writer completes 430 the bulk transfer and allows the reader to read all cache lines. After, the writer may again specify 405 cache lines as not safe to read, and repeat the method described in the flowchart 400.

As will be appreciated, the disclosed technology is advantageous for applications where there can be a large serialization delay, such as in Ethernet networking. As will be appreciated, with certain embodiments of the present disclosure, in the case of Ethernet networking where an FPGA is writing data it receives from the network to a CPU which reads the data for further processing, the CPU can begin processing chunks of received data while waiting for the rest of the packet to arrive to the FPGA. In a configuration where it takes 800 nanoseconds to serialize 1000 bytes at 10 gigabytes per second, the first 64-byte chunk (i.e., the size of one cache line) can be serialized in approximately 52 ns. By providing the ability for the CPU to process the first chunk of data while waiting for the rest of the packet to arrive at the FPGA, a system implementing aspects of the present disclosure gets a 750 ns head start over a conventional transfer method.

Figure 5:
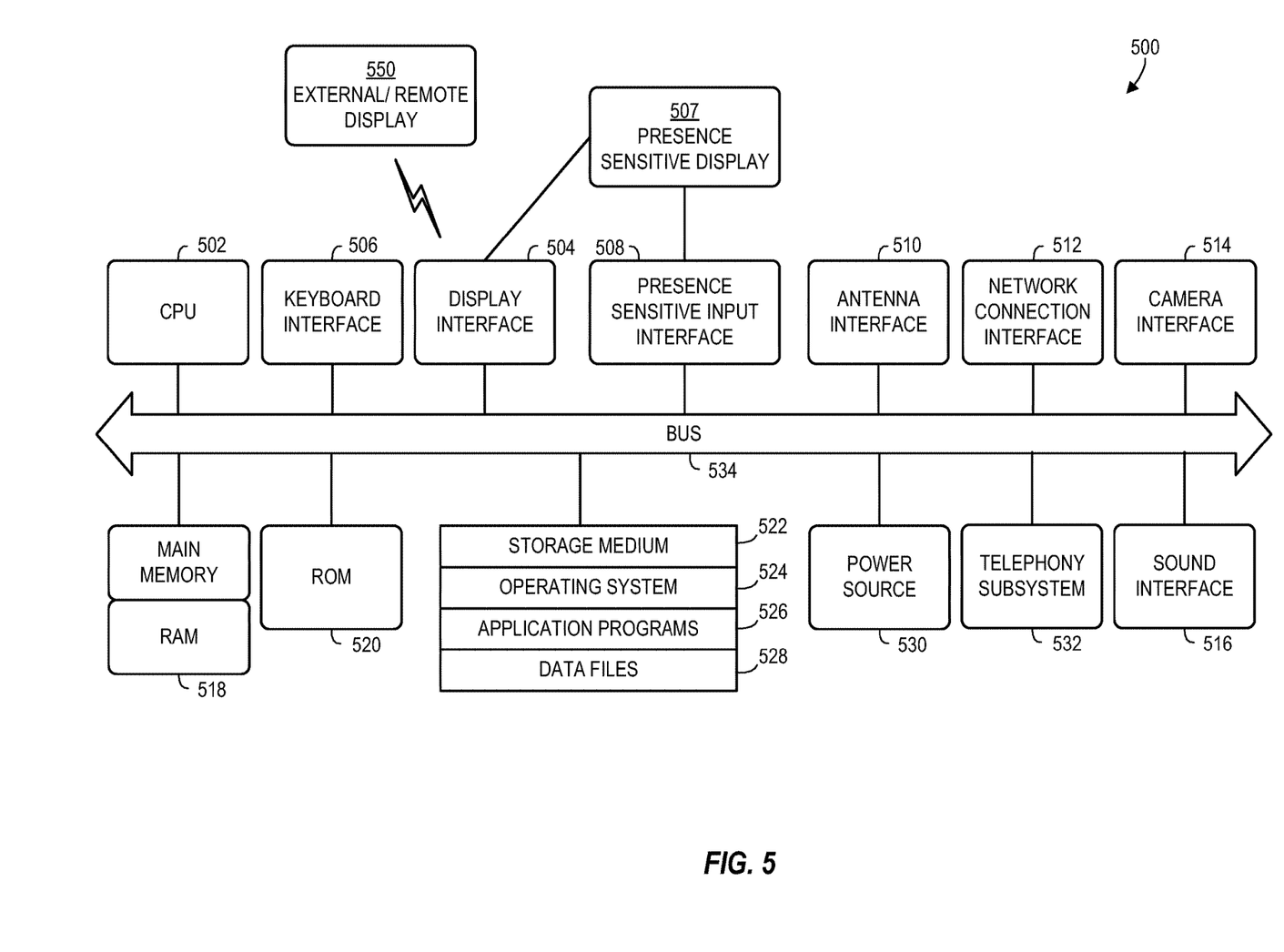
FIG. 5 is a block diagram of an illustrative computer system architecture, according to an example implementation.

Aspects of the disclosed technology may be implementing using at least some of the components illustrated in the computing device architecture 500 of FIG. 5. As shown, the computing device architecture includes a central processing unit (CPU) 502, where computer instructions are processed; a display interface 504 that acts as a communication interface and provides functions for rendering video, graphics, images, and texts on the display. In certain example implementations of the disclosed technology, the display interface 504 may be directly connected to a local display, such as a touch-screen display associated with a mobile computing device. In another example implementation, the display interface 504 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 504 may wirelessly communicate, for example, via a Wi-Fi channel or other available network connection interface 512 to the external/remote display.

In an example implementation, the network connection interface 512 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 504 may be operatively coupled to a local display, such as a touch-screen display associated with a mobile device. In another example, the display interface 504 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 504 may wirelessly communicate, for example, via the network connection interface 512 such as a Wi-Fi transceiver to the external/remote display.

The computing device architecture 500 may include a keyboard interface 506 that provides a communication interface to a keyboard. In one example implementation, the computing device architecture 500 may include a presence-sensitive display interface 508 for connecting to a presence-sensitive display 507. According to certain example implementations of the disclosed technology, the presence-sensitive display interface 508 may provide a communication interface to various devices such as a pointing device, a touch screen, a depth camera, etc. which may or may not be associated with a display.

The computing device architecture 500 may be configured to use an input device via one or more of input/output interfaces (for example, the keyboard interface 506, the display interface 504, the presence sensitive display interface 508, network connection interface 512, camera interface 514, sound interface 516, etc.,) to allow a user to capture information into the computing device architecture 500. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 500 or may be a separate device. For example, the input device may be an accelerometer, a magnetometer, a digital camera, a microphone, and an optical sensor.

Example implementations of the computing device architecture 500 may include an antenna interface 510 that provides a communication interface to an antenna; a network connection interface 512 that provides a communication interface to a network. As mentioned above, the display interface 504 may be in communication with the network connection interface 512, for example, to provide information for display on a remote display that is not directly connected or attached to the system. In certain implementations, a camera interface 514 is provided that acts as a communication interface and provides functions for capturing digital images from a camera. In certain implementations, a sound interface 516 is provided as a communication interface for converting sound into electrical signals using a microphone and for converting electrical signals into sound using a speaker. According to example implementations, a random-access memory (RAM) 518 is provided, where computer instructions and data may be stored in a volatile memory device for processing by the CPU 502.

According to an example implementation, the computing device architecture 500 includes a read-only memory (ROM) 520 where invariant low-level system code or data for basic system functions such as basic input and output (I/O), startup, or reception of keystrokes from a keyboard are stored in a non-volatile memory device. According to an example implementation, the computing device architecture 500 includes a storage medium 522 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 524, application programs 526 (including, for example, a web browser application, a widget or gadget engine, and or other applications, as necessary) and data files 528 are stored. According to an example implementation, the computing device architecture 500 includes a power source 530 that provides an appropriate alternating current (AC) or direct current (DC) to power components.

According to an example implementation, the computing device architecture 500 includes and a telephony subsystem 532 that allows the device 500 to transmit and receive sound over a telephone network. The constituent devices and the CPU 502 communicate with each other over a bus 534.

According to an example implementation, the CPU 502 has appropriate structure to be a computer processor. In one arrangement, the CPU 502 may include more than one processing unit. The RAM 518 interfaces with the computer bus 534 to provide quick RAM storage to the CPU 502 during the execution of software programs such as the operating system application programs, and device drivers. More specifically, the CPU 502 loads computer-executable process steps from the storage medium 522 or other media into a field of the RAM 518 in order to execute software programs. Data may be stored in the RAM 518, where the data may be accessed by the computer CPU 502 during execution. In one example configuration, the device architecture 500 includes at least 58 MB of RAM, and 256 MB of flash memory.

The storage medium 522 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 522, which may comprise a machine-readable storage medium.

According to one example implementation, the term computing device, as used herein, may be a CPU, or conceptualized as a CPU (for example, the CPU 502 of FIG. 5). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example embodiment, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person of ordinary skill to practice certain implementations of the disclosed technology, including making and using any devices or systems and performing any incorporated methods. The patentable scope of certain implementations of the disclosed technology is defined in the claims, and may include other examples that occur to those of ordinary skill. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   a reader;
   a writer; and a shared memory shared by the reader and the writer,
   wherein the writer is configured to:
      specify, in the shared memory, a first cache line and a second cache line as unsafe to read;
      prefetch sole ownership of the first and second cache lines, creating a first prefetched cache line and a second prefetched cache line;
      specify, after the prefetching and before writing data to the first and second prefetched cache lines, that the first and second prefetched cache lines are safe to read;
      receive, from the reader, after specifying that the first and second prefetched cache lines are safe to read and before completing writing data to the first prefetched cache line, a request to read the first prefetched cache line;
      delay a response to the reader regarding the first prefetched cache line until writing data to the first prefetched cache line is complete;
      write data to the first prefetched cache line in the shared memory; and
      in response to completing writing data to the first prefetched cache line, relinquish control of the first prefetched cache line to the reader.

2. The system of claim 1, wherein the writer is further configured to:
   write data to the second prefetched cache line; and
   in response to completing writing data to the second prefetched cache line, relinquish control of the second prefetched cache line to the reader.

3. The system of claim 2, wherein the writer is configured to relinquish control of the first prefetched cache line before completing writing data to the second prefetched cache line.

4. The system of claim 2, wherein the writer is further configured to:
   receive, from the reader, after specifying that the first and second prefetched cache lines are safe to read and before completing writing data to the second prefetched cache line, a request to read the second prefetched cache line; and
   delay a response to the reader regarding the second prefetched cache line until writing data to the second prefetched cache line is complete.

5. The system of claim 4, wherein the reader is configured to begin reading the first prefetched cache line prior to receiving the response regarding the second prefetched cache line.

6. The system of claim 1, wherein the writer is configured to specify the first and second cache lines as unsafe to read by setting an indicator flag, and specify the first and second cache lines as safe to read by resetting the indicator flag.

7. The system of claim 1, wherein the writer is configured to prefetch sole ownership of the first and second cache lines by setting the first and second cache lines to a Modified ("M") state or an Exclusive ("E") state.

8. A write method comprising:
   specifying a first cache line and a second cache line as unsafe to read;
   prefetching sole ownership of the first and second cache lines, creating a first prefetched cache line and a second prefetched cache line;
   specifying, after the prefetching and before writing data to the first and second prefetched cache lines, that the first and second prefetched cache lines are safe to read;
   receiving, from a reader, after specifying that the first and second prefetched cache lines are safe to read and before completing writing data to the first prefetched cache line, a request to read the first prefetched cache line;
   delay a response to the reader regarding the first prefetched cache line until writing data to the first prefetched cache line is complete;
   writing data to the first prefetched cache line; and
   in response to writing data to the first prefetched cache line being complete, relinquishing control of the first prefetched cache line to the reader.

9. The method of claim 8 further comprising:
   writing data to the second prefetched cache line; and
   in response to writing data to the second prefetched cache line being complete, relinquishing control of the second prefetched cache line to the reader.

10. The method of claim 9, wherein the control of the first prefetched cache line is relinquished before writing data to the second prefetched cache line is complete.

11. The method of claim 9 further comprising:
    receiving, from the reader, after specifying that the first and second prefetched cache lines are safe to read and before completing writing data to the second prefetched cache line, a request to read the second prefetched cache line; and delaying a response to the reader regarding the second prefetched cache line until writing data to the second prefetched cache line is complete.

12. The method of claim 11, wherein the reader reads the first prefetched cache line prior to receiving the response regarding the second prefetched cache line.

13. A writer comprising:
a connector to a shared memory; and
a processor configured to:
specify, in the shared memory, a first cache line and a second cache line as unsafe to read;
prefetch sole ownership of the first and second cache lines, creating a first prefetched cache line and a second prefetched cache line;
specify, after the prefetching and before writing data to the first and second prefetched cache lines, that the first and second prefetched cache lines are safe to read;
receive, from a reader connected to the shared memory, after specifying that the first and second prefetched cache lines are safe to read and before completing writing data to the first prefetched cache line, a request to read the first prefetched cache line;
delay a response to the reader regarding the first prefetched cache line until writing data to the first prefetched cache line is complete;
write data to the first prefetched cache line in the shared memory; and
in response to completing writing data to the first prefetched cache line, relinquish control of the first prefetched cache line to the reader.

14. The writer of claim 13, wherein the processor is further configured to:
write data to the second prefetched cache line; and
in response to completing writing data to the second prefetched cache line, relinquish control of the second prefetched cache line to the reader.

15. The writer of claim 14, wherein the processor is configured to relinquish control of the first prefetched cache line before completing writing data to the second prefetched cache line.

16. The writer of claim 14, wherein the processor is further configured to:
receive, from the reader, after specifying that the first and second prefetched cache lines are safe to read and before completing writing data to the second prefetched cache line, a request to read the second prefetched cache line; and
delay a response to the reader regarding the second prefetched cache line until writing data to the second prefetched cache line is complete.

17. The writer of claim 16, wherein the reader is configured to begin reading the first prefetched cache line prior to receiving the response regarding the second prefetched cache line.

18. The writer of claim 17, wherein the writer comprises a field-programmable gate array (FPGA).

19. The system of claim 1, wherein the writer is configured to relinquish control of the first prefetched cache line before completing writing data to the second prefetched cache line.

20. The system of claim 1, wherein, responsive to relinquishing control of the first prefetched cache line to the reader, the writer is configured to again specify the first cache line as unsafe to read.

* * * * *